United States Patent [19]
Mott

[11] Patent Number: 5,992,614
[45] Date of Patent: Nov. 30, 1999

[54] TENSIONING DEVICE FOR A BELT SCRAPER

[75] Inventor: George T. Mott, Alburtis, Pa.

[73] Assignee: ASGCO Manufacturing, Inc., Allentown, Pa.

[21] Appl. No.: 09/117,085

[22] PCT Filed: Dec. 2, 1997

[86] PCT No.: PCT/US97/22241

§ 371 Date: Jul. 23, 1998

§ 102(e) Date: Jul. 23, 1998

[87] PCT Pub. No.: WO98/24716

PCT Pub. Date: Jun. 11, 1998

[51] Int. Cl.[6] .................................................. B65G 45/16
[52] U.S. Cl. .......................................................... 198/499
[58] Field of Search ................................. 198/497, 499

[56] References Cited

U.S. PATENT DOCUMENTS

| | | | |
|---|---|---|---|
| 4,533,036 | 8/1985 | Gordon | 198/499 |
| 4,541,523 | 9/1985 | Stockton | 198/499 |
| 4,754,868 | 7/1988 | Hughes et al. | 198/499 |
| 4,825,997 | 5/1989 | Bowman et al. | 198/499 |
| 4,854,443 | 8/1989 | Gordon | 198/499 X |
| 5,201,402 | 4/1993 | Mott | 198/199 |
| 5,378,202 | 1/1995 | Swinderman | 198/499 X |
| 5,385,507 | 1/1995 | Swearingen et al. | 472/92 |

*Primary Examiner*—James R. Bidwell
*Attorney, Agent, or Firm*—Dann, Dorfman, Herrell and Skillman, P.C.

[57] ABSTRACT

A tensioning device for adjusting the contacting/cleaning force of a scraper blade on the surface of an endless conveyor belt is provided for use on a shaft supporting the scraper blade. The tensioning device allows the shaft to be rotated and locked in a position which is very close to its optimum cleaning position, thereby increasing the efficiency of the scraper assembly. The disclosed tensioning device has three collars with a spring located in between the rotatable collar and adjusting collar. Sequences of axially-directed apertures on the adjusting collar and the stationary collar move into and out of registry with each other as the adjusting collar is rotated. A locking pin is inserted through the aligned holes in the adjusting collar and the stationary collar when the desired amount of torsion is applied to the shaft.

9 Claims, 5 Drawing Sheets

TENSIONING DEVICE FOR A BELT SCRAPER

FIELD OF THE INVENTION

The present invention relates to a tensioning device for adjusting the force with which the blade of a conveyor belt scraper contacts the conveyor belt surface.

BACKGROUND OF THE INVENTION

U.S. Pat. No. 5,201,402, assigned to ASGCO Manufacturing, Inc., assignee of the present application, describes a tensioning device for adjusting the contacting force of a scraper blade on an endless conveyor belt. The tensioning device described therein is a rotary tensioner which adjusts the contacting force of the scraper blade on the conveyor belt surface by controlling the torque exerted on a rotatable shaft that supports the scraper blade. To that end a tensioning collar and an adjustment collar are disposed adjacent to one another on the support shaft. The adjustment collar is fixed to and rotates with the support shaft. The tensioning collar is attached to one end of a torsional bias mechanism such as a coil spring. The other end of the bias mechanism is fixed to the conveyor belt frame. Each collar has a series of holes formed therethrough, the holes being arrayed at a selected radial distance from the axis of the support shaft. As the collars are rotated relative to each other, the torsional bias on the support shaft is increased or decreased, and the holes on one collar move into and out-of axial alignment with the holes on the other collar. Each series of holes has different spacing between respective holes so that the torsional bias can be adjusted in very small increments. The collars are locked into relative position by the insertion of a lock-pin through two aligned holes.

Although the known device works well, in practice it was found that adjustment of the torsional bias of the tensioning device requires the efforts of two persons. In the arrangement described in the aforesaid patent, one hand is necessary to rotate the tensioning collar and a second hand is necessary to hold the scraper blade in engagement with the conveyor belt surface by rotating the support shaft. The latter operation is usually performed by rotating the adjustment collar in a direction counter to that of the tensioning collar. A third hand is then necessary to insert the locking pin through the aligned holes in the collars because the first two hands must be used to maintain the two collars in proper alignment.

SUMMARY OF THE INVENTION

In accordance with the present invention, a tensioning device for adjusting the contacting force of a scraper blade on an endless conveyor belt is provided. The tensioning device adjusts the contacting force of the scraper blade on the conveyor belt surface by controlling the torque exerted on the rotatable shaft by the torsion bias mechanism. The tensioning device is designed to be operated by a single person with very little difficulty.

The tensioning device has a support shaft with an axis parallel to the conveyor belt. The tensioning device comprises three collars and a torsion bias mechanism located on the support shaft. A rotatable collar is fixed to the free end of the shaft. An adjusting collar is rotatable about the axis of the shaft and has a sequence of apertures spaced circumferentially about the adjusting collar in equal increments. A torsion bias mechanism, disposed between the rotatable collar and the stationary collar, is attached at one end to the adjusting collar and attached at the other end to the rotatable collar. A stationary collar, located adjacent to the adjusting collar, is fixed to the conveyor frame and has a sequence of apertures spaced circumferentially about the stationary collar in equal increments.

As the adjusting collar is rotated, holes from the adjusting collar and the stationary collar move into and out of registry with one another. The tensioning device is locked by inserting a lock pin in a pair of registered holes. The bias placed on the torsion bias mechanism by the rotation of the adjusting collar causes the shaft to rotate and maintain tension in the scraper blade against the belt. A single person can both rotate the adjusting collar and insert the lock pin through the apertures in the adjusting collar and stationary collar.

DETAILED DESCRIPTION OF PREFERRED EMBODIMENT

Figure 1:
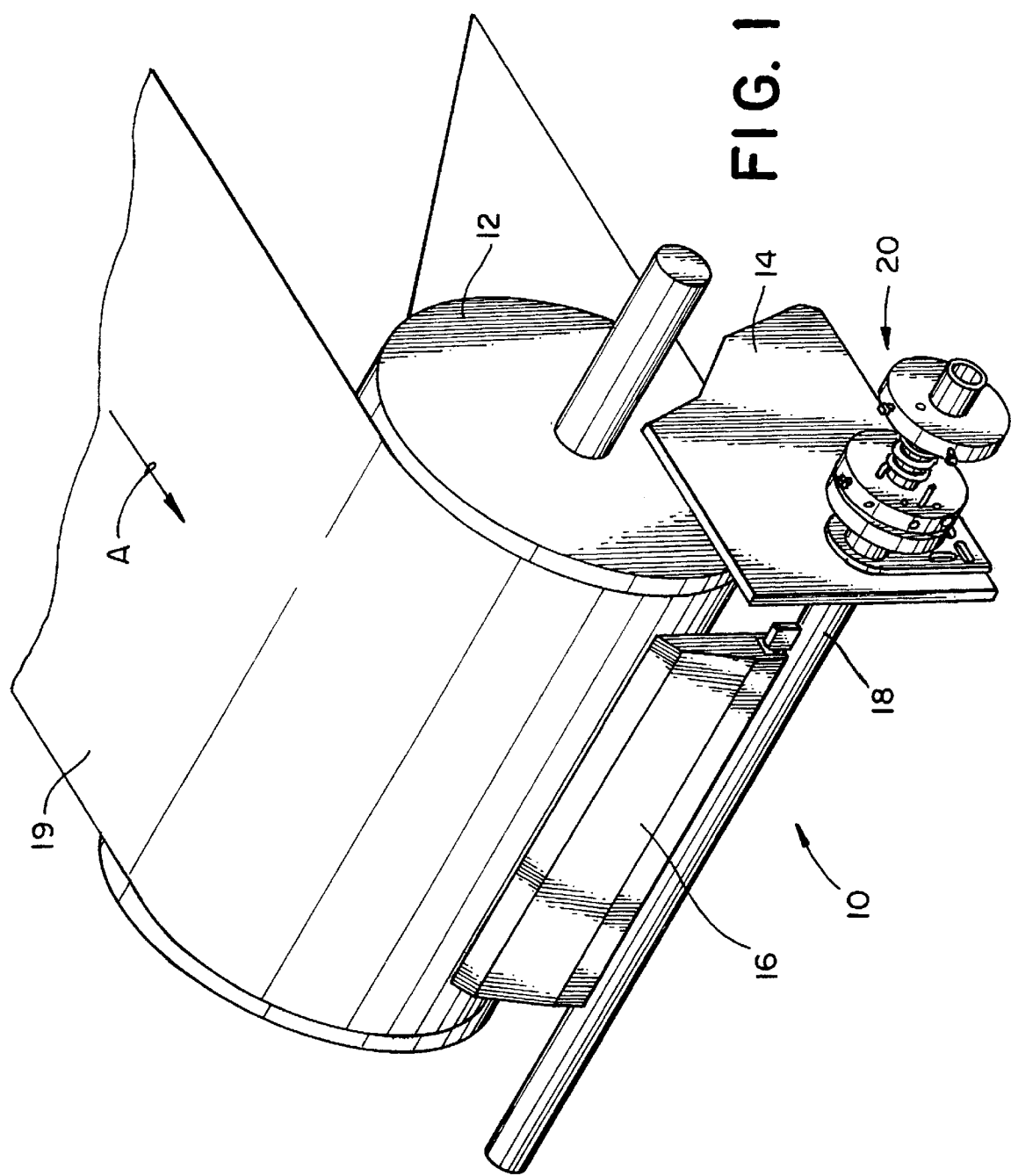
FIG. 1 is a perspective view of a conveyor belt scraping assembly having a rotary tensioning device in accordance with the present invention.

Referring now to the drawings and in particular FIG. 1 there is shown a conveyor belt scraper assembly 10 which is disposed adjacent the head roller 12 of an endless conveyor belt 19 that moves in the direction indicated by the arrow "A". The conveyor belt scraper assembly includes at least one scraper blade 16 that is mounted on a rotatable support shaft 18. A tensioning device, denoted generally by the reference numeral 20, is disposed at one end of support shaft 18. The tensioning device 20 is constructed and arranged to exert a torque on shaft 18 which forces the scraper blade 16 into tight engagement with the surface of conveyor belt 19.

Figure 2:
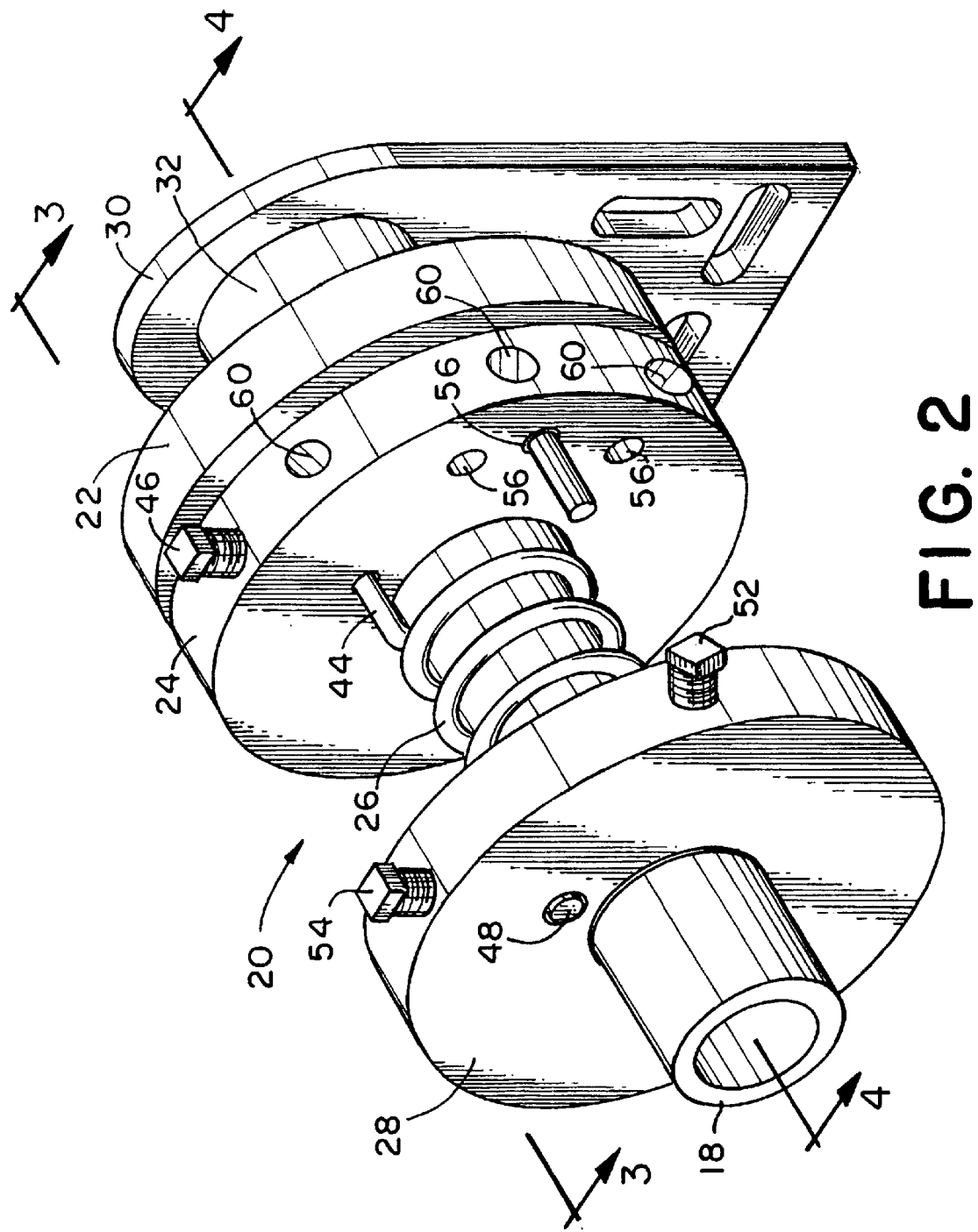
FIG. 2 is a perspective view of the rotary tensioning device shown in FIG. 1.
Figure 3:
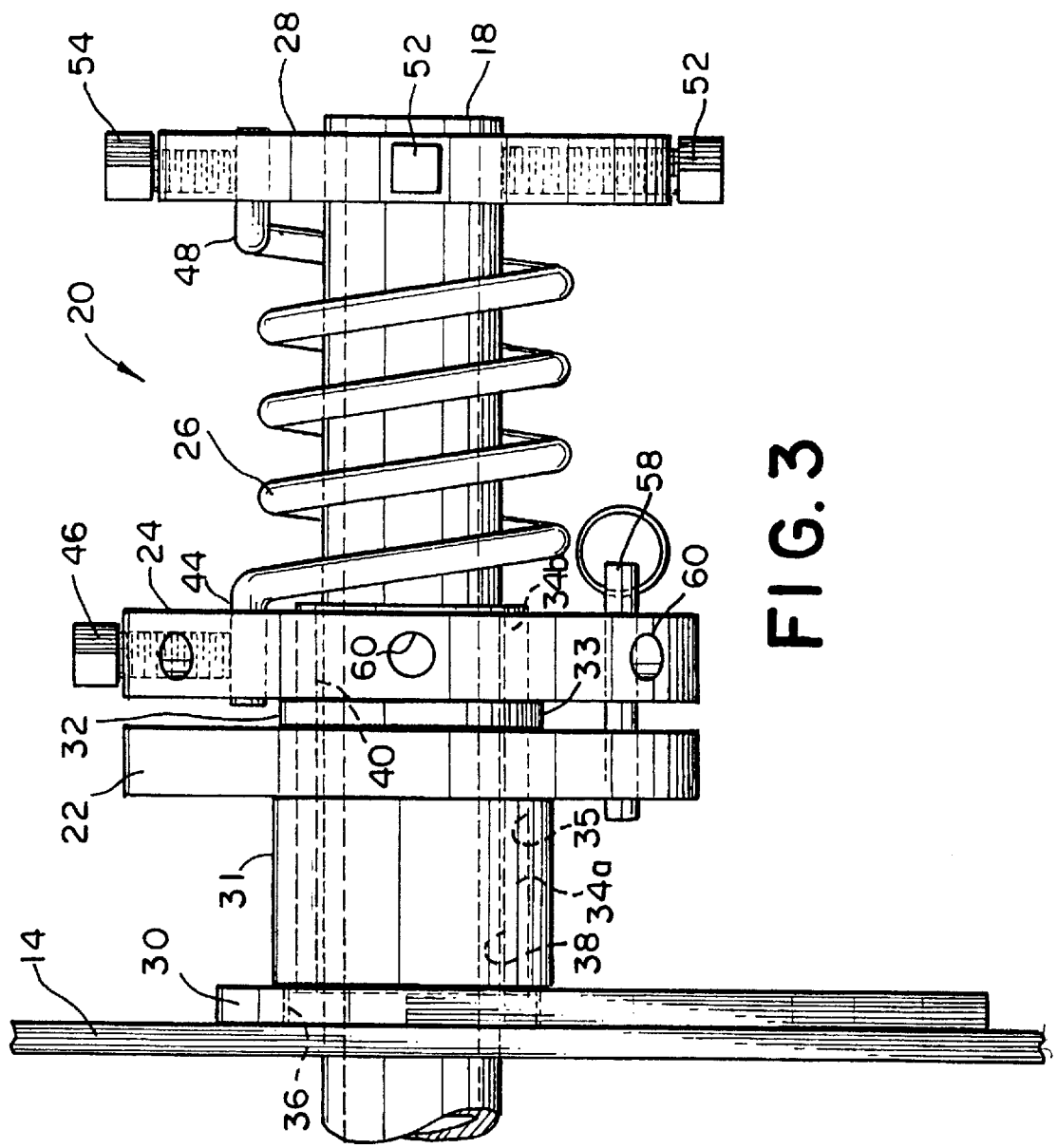
FIG. 3 is a front elevational view of the rotary tensioning device of FIG. 2 as viewed along line 3—3 therein.
Figure 4:
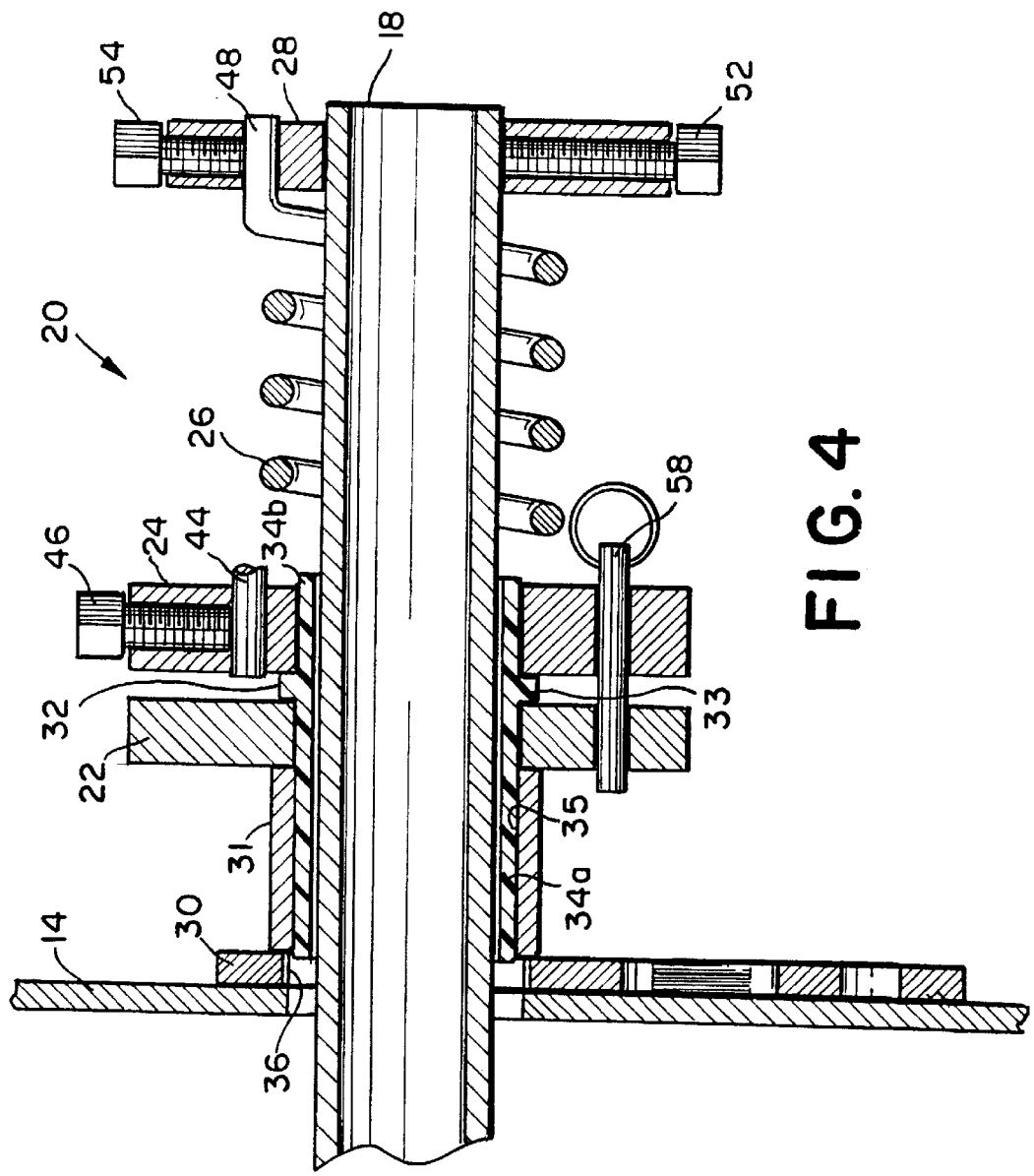
FIG. 4 is a front elevational view in partial section of the rotary tensioning device of FIG. 2 as viewed along line 4—4 therein.

Referring now to FIGS. 2, 3, and 4, the tensioning device 20 is shown in greater detail. The tensioning device 20 includes a stationary collar 22, an adjusting collar 24, a coil spring 26, and a rotatable collar 28 all of which surround support shaft 18 and are aligned coaxially therewith. Stationary collar 22 is affixed to a mounting bracket 30 through a spacer sleeve 31. The mounting bracket 30 is constructed for attachment to a fixed support structure such as the conveyor frame 14. A bearing spacer 32 has a ring-shaped portion 33 disposed between stationary collar 22 and adjusting collar 24. Bearing spacer 32 also has a first barrel-shaped portion 34a which extends from the ring-shaped portion 33 through a central bore in stationary collar 22 and through a central bore in spacer sleeve 31. A second barrel-shaped portion 34b of bearing spacer 32 extends from the ring-shaped portion through a central bore in adjusting collar 24. The bearing spacer 32 is formed of a synthetic plastic material such as nylon to provide a low friction, protective bearing surface between adjusting collar 24 and stationary collar 22 and between shaft 18, spacer sleeve 31, and adjusting collar 24. The presence of the bearing spacer 32 is particularly effective in corrosive environments to prevent corrosion welding between the stationary collar 22 and adjusting collar 24. The ring portion 33 also functions to maintain a fixed space between stationary collar 22 and adjusting collar 24 which facilitates the visual alignment of apertures on the respective collars.

The adjusting collar 24 has a central bore therethrough which is dimensioned such that adjusting collar 24 is free to rotate about support shaft 18. A first end 44 of coil spring 26 is fastened in a first aperture formed in adjusting collar 24 and is held in place there by a set screw 46. The other end 48 of coil spring 26 is disposed in an aperture formed through rotating collar 28 and is held in place by a set screw 54. The rotating collar 28 is fixed to support shaft 18 by means of set screws 52 disposed at selected locations about the circumference of rotating collar 28.

When the desired amount of torque has been applied to support shaft 18 by aligning an aperture 56 on adjusting collar 24 with an aperture 62 on stationary collar 22, a locking pin 58 is inserted through the aligned apertures to prevent relative rotation between the two collars 22 and 24. The arrangement and use of the apertures are described more fully hereinbelow. The adjusting collar 24 also has a plurality of tool engagement holes 60 radially disposed at selected intervals about the periphery thereof for receiving receiving an adjusting tool or lever to assist in rotating adjusting collar 24 to bias spring 26 to the proper torsional tension. It is contemplated that instead of a coil spring, the torsion bias device can be embodied as a piece of resilient elastomeric material having sufficient elasticity and strength to permit the controlled torsional deformation that is necessary for adjusting the torque applied to the shaft 18. Suitable materials and their relevant properties are known to those skilled in the art. When using such materials, they are preferably formed in the shape of a right cylinder that is disposed around the support shaft 18. One end of the cylinder is attached to the adjusting collar 24 and the other end is attached to the rotating collar 28.

Referring now to FIGS. 5a–5f, adjusting collar 24 has a preselected number of equally-spaced, axially-directed apertures 56 radially located on a circle having a radius "r" measured from the axis of rotation of the adjusting collar 24. The apertures 56 are arrayed circumferentially and spaced a preselected angular distance "a" from each other. In a preferred embodiment, the adjusting collar 24 has fifteen apertures 56 consecutively spaced in a sequence at 22.5 degrees of arc from each other. The spacing between the first and last aperture in the sequence is twice the spacing within the sequence because a different aperture is needed near that location to secure the end 44 of the torsion spring 26.

Referring back to FIGS. 2–4, the adjusting collar 24 cooperates with an adjacently-mounted, third or stationary collar 22 to adjust the torque exerted on the shaft 18 by the torsion spring 26. The stationary collar 22 is welded or otherwise fixed to the mounting bracket 30. The stationary collar 22 is preferably smaller in diameter than the adjusting collar 24, but may be equal or larger in diameter compared to the adjusting collar 24 or the rotatable collar 28.

The stationary collar 22 preferably has a preselected number of equally-spaced, axially-directed apertures 62 radially located on a circle having the radius "r" measured from the axis of rotation of the adjusting collar 24 as indicated in FIGS. 5a–5f. The apertures 62 are circumferentially spaced by an angular distance "b". In the embodiment shown, the stationary collar 22 has five apertures consecutively spaced at 18 degrees of arc from each other. The angular spacing between the apertures is 80% of the spacing between the apertures 56 of adjusting collar 24. The radius "r" of the arc of the apertures 62 on the stationary collar 22 is the same radius as the series of apertures 56 on the adjusting collar 24. However, for the purpose of clarity of illustration, the circle of apertures 62 is shown on a larger radius in FIGS. 5a–5f.

The apertures in the adjusting collar 24 and the stationary collar 22 preferably have the same size diameter to receive the locking pin 58 when a pair of holes (one each from the adjusting collar 24 and stationary collar 22) are properly aligned. The position of the locking pin 58 is represented by the shaded apertures 58a–58f. Since the circumferential spacing between the stationary collar apertures 62 and the adjusting collar apertures 56 is different, only one pair of holes 56, 62 are properly aligned at a time. As the adjusting collar 24 is rotated, a different pair of apertures becomes aligned, thereby changing the amount of torque exerted by spring 26.

Figure 5A:
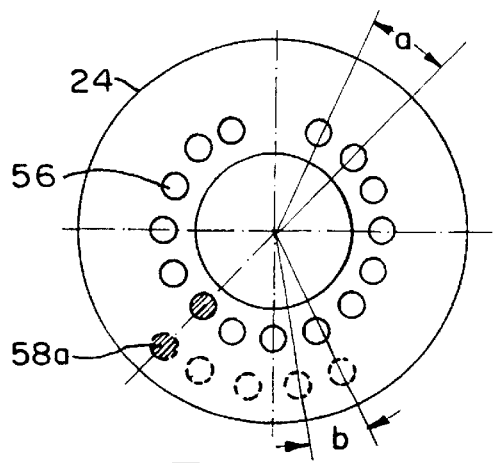
FIGS. 5a–5f are diagrammatic illustrations of the rotation and alignment of the apertures in the stationary collar 22 and adjusting collar 24 used in the rotary tensioning device of FIG. 1.
Figure 5B:
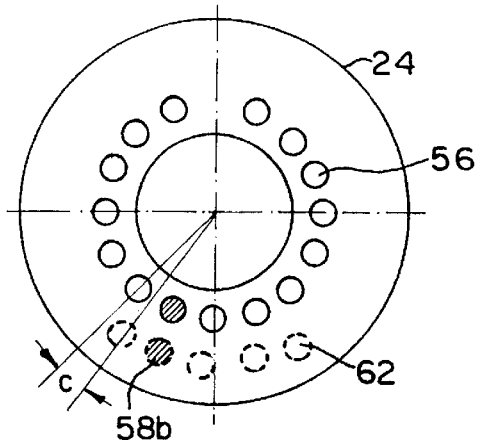
Figure 5C:
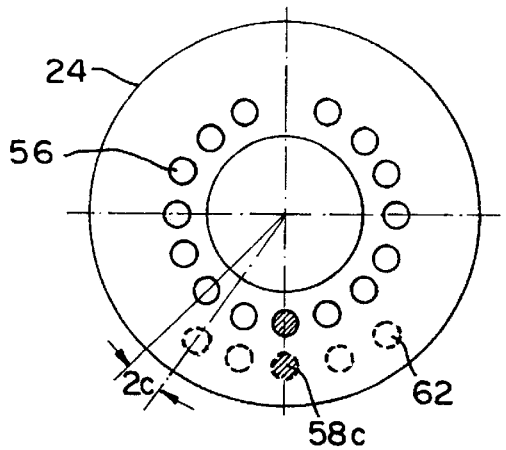
Figure 5D:
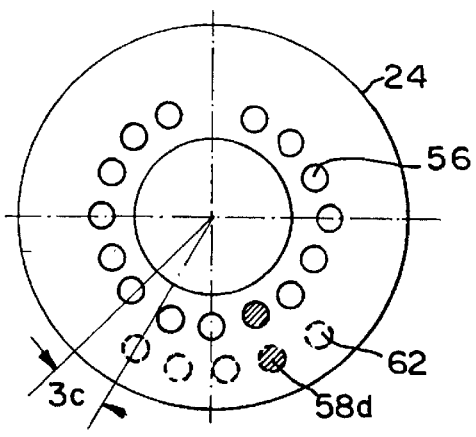
Figure 5E:
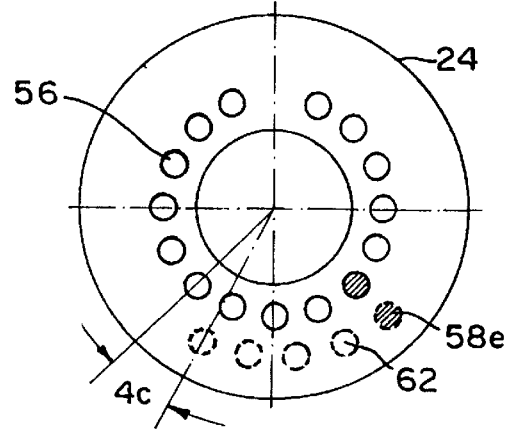
Figure 5F:
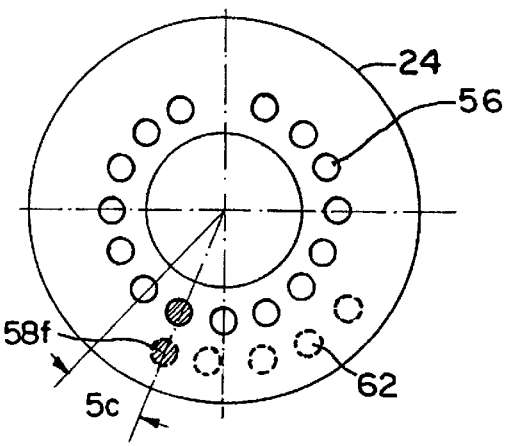

The sequential registration of the apertures on the stationary collar 22 and adjusting collar 24 is diagrammatically illustrated in FIGS. 5a–5f for a tensioner having an incremental adjustment "c" of 4.5 degrees of arc. As shown in FIG. 5a, two holes 56, 62 are aligned at position 58a and are capable of receiving a common lock pin to prevent movement of the adjusting collar 24 and stationary collar 22 relative to each other. In the embodiment, starting from the 12:00 position on the circle defined by the apertures 56, the fifth aperture 62 is registered with the tenth aperture 56. To adjust or tighten the scraping blade, the locking pin 58 is removed and the adjusting collar 24 is rotated an angular increment c, i.e., 4.5 degrees until the next pair of holes 56, 62 are properly to receive the locking pin as illustrated at 58b in FIG. 5b. In this case, the fourth aperture 62 registers with the ninth aperture 56. If the tension on the scraper blade is still insufficient, the adjustment collar can be rotated an additional increment until another set of apertures are aligned as illustrated at 58c in FIG. 5c. Here the third aperture 62 registers with the eighth aperture 56. FIGS. 5a–5f illustrate the sequence of registry of the apertures as the adjustment is rotated through additional increments, at which point the fifth aperture 62 once again registers or aligns with an aperture on the adjusting collar 24 as illustrated at 58f in FIG. 5f, in this case the ninth aperture of sequence 56.

The sensitivity of the present tensioning device is not limited by the minimum spacing between the apertures on either collar. The minimum adjustment increment of the present tensioning device is far less than the minimum distance between apertures on either the adjusting collar or the stationary collar. This increased sensitivity allows the scraper blades to be adjusted much closer to their optimum cleaning position and, thus, increases the efficiency of the scraper blade assembly.

The preferred embodiment of the tensioning device allows for adjustment in increments of 20% of the spacing between the apertures 56, i.e., 4.5 degrees. In further embodiments, the tensioner may be designed for adjustment in even smaller increments by changing the number and spacing of apertures on the stationary collar 22.

The number of apertures on the stationary collar, Y, is calculated by dividing the desired incremental adjustment in degrees, c, into the relative spacing of the apertures on the adjusting collar in degrees, a.

$Y = a/c$

The relative spacing of the apertures on the stationary collar in degrees, "b", is calculated by subtracting the desired incremental adjustment in degrees, "c", from the relative spacing in degrees of the apertures on the adjusting collar, "a".

$$b = a - c$$

For example, a tensioner having an incremental adjustment of 1.5 degrees and having apertures on the adjusting collar equally spaced every 22.5 degrees, requires fifteen apertures (Y=22.5/1.5) on the stationary collar. The relative spacing of the apertures on the stationary collar is 21 degrees (b=22.5°−1/5°). It should be noted that 15 apertures are spaced over 315 degrees of the circle on the stationary collar. Using the aforementioned equations, the specific design parameters of the present tensioning device can be adjusted to accommodate various applications.

In a further embodiment illustrated in FIGS. 5a–5f, at least one of the apertures on the stationary collar 22 is offset from the consecutive series of apertures as previously illustrated. The location and spacing of the respective apertures is calculated in the same manner as the first illustrated embodiment. However, the apertures which are offset from the consecutive sequence should be offset by the distance, or a whole factor of the distance, between apertures on the adjusting collar. For example, the stationary collar 22 having a 4.5 degrees adjustment, has a consecutive sequence of apertures 62 located at 0°, 18°, 36°, 54°, and 72°. In this further embodiment, the second and fourth apertures 62 are offset a distance (N×a), from their original location, where "N" is a whole number which is chosen to locate the offset aperture(s) in the desired location and "a", as previously mentioned is the arcuate distance between apertures 56 on the adjusting collar 24. Thus, location of any one of the offset apertures relative to the first or reference aperture in the series is determined by the relationship $$[(n-1) \times (a-c)] + (N \times a),$$

where n is the order of the aperture in the sequence before offsetting.

In each of the aforementioned embodiments, it is preferred that the total arc required for the holes on the adjustment collar be less than 360°. Thus, Y×b should be less than 360° to avoid overlap of apertures on the adjustment collar.

Referring again to FIG. 1, the axially-directed apertures 56, 62 on the adjusting collar 24 and the stationary collar 22, respectively, are aligned normal to the direction of falling debris which is scraped from the belt 19. Because of that orientation the apertures are resistant to contamination from such falling debris which could clog the apertures and make insertion of locking pin 58 difficult.

It will be appreciated from the foregoing description that in using the tensioner described hereinabove, only one hand is needed to rotate the blade into engagement with the belt and tension the spring, thereby leaving the operator's other hand free to insert the locking pin 58 through or remove it from the aligned adjusting holes. In that manner, the tensioning operation can be performed by a single person with very little difficulty, if any.

Those skilled in the art will recognize that changes or modifications may be made to the above-described embodiments without departing from the broad inventive concept of the invention. It should therefore be understood that this invention is not limited to the particular embodiments described herein but is intended to include all changes and modifications that are within the scope and spirit of the invention as set forth in the following claims.

What is claimed is:

1. A tensioning device for adjusting the contacting force of a scraper blade on the surface of an endless conveyor belt mounted in a support structure, the tensioning device comprising:

a shaft having an axis parallel to the conveyor belt;

a first collar attached to said shaft;

a second collar having a bore for receiving said shaft and being rotatable about said shaft, said second collar having at least one aperture at a preselected distance from the axis of said shaft;

a torsion bias mechanism for applying torsion to bias said shaft and have the blade bear against the conveyor belt, said torsion bias mechanism being disposed between said second collar and said first collar and having one end attached to said second collar and the other end attached to said first collar;

a third collar attached to the support structure and disposed adjacent to said second collar along said shaft, said third collar having at least one aperture at the preselected distance from the axis of said shaft, said third collar also having a central bore for receiving said shaft therethrough; and a locking pin adapted to engage an aperture of said second collar and an aperture of said third collar when the apertures are in registry with one another.

2. The tensioning device as recited in claim 1, further comprising a spacer sleeve extending laterally from the support structure and affixed to said third collar for affixing said third collar to the support structure, said spacer sleeve having a central bore aligned coaxially with the central bore of said third collar.

3. The tensioning device as recited in claim 1, wherein said second collar has a sequence of apertures which are spaced circumferentially about said second collar at the preselected distance from the axis of said shaft.

4. The tensioning device as recited in claim 1, wherein said third collar has a sequence of apertures which are spaced circumferentially about said third collar at the preselected distance from the axis of said shaft.

5. The tensioning device as recited in claim 1, wherein said torsion bias mechanism comprises a coil spring.

6. The tensioning device as recited in claim 1, wherein said second collar has at least one radially directed aperture in the outer surface thereof for receiving a tool for rotating said second collar about the axis of said shaft.

7. The tensioning device as recited in claim 1, further comprising a non-corrosive bearing spacer disposed between said second collar and said third collar and formed to maintain a fixed space between said second collar and said third collar.

8. The tensioning device as recited in claim 7, wherein said bearing spacer is formed of an anti-friction material to reduce friction between said second collar and said third collar.

9. The tensioning device as recited in claim 7, wherein said bearing spacer comprises a first barrel-shaped portion disposed between said second collar and said shaft and a second barrel-shaped portion disposed between said third collar and said shaft.

* * * * *